Patented Dec. 9, 1947

2,432,393

UNITED STATES PATENT OFFICE 2,432,393

MONOAZO COMPOUNDS CONTAINING A CF₃ GROUP

Joseph B. Dickey and James G. McNally, Rochester, N. Y., assignors to Eastman Kodak Company, Rochester, N. Y., a corporation of New Jersey No Drawing. Application January 20, 1943, Serial No. 472,984

5 Claims. (Cl. 260—205)

1

This invention or discovery relates to new azo compounds and their application to the art of dyeing or coloring. Textile materials such as organic derivatives of cellulose, wool, silk, and nylon and lacquers composed of cellulose esters and cellulose ethers, for example, can be colored. Coloration can be effected by dyeing, printing, stencilling or other suitable methods.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of our invention or discovery to provide a new class of azo compounds. Another object of our invention or discovery is to provide colored textile materials which are of good fastness to light and washing. A further object is to provide a process for the direct coloration of organic derivatives of cellulose, wool, silk and nylon textile materials. A particular object is to provide a new class of nuclear non-sulfonated azo compounds suitable for the coloration of cellulose acetate. A still further object is to provide a satisfactory process for the preparation of the new azo compounds of our invention or discovery.

The azo compounds by means of which the above objects are accomplished or made possible consist of the azo compounds having the formula:

$$R-N=N-R_1$$

wherein $R-N=N-$ stands for the residue of a diazotized member selected from the group consisting of an arylamino compound of the benzene series, an arylamino compound of the naphthalene series and an aminoazobenzene and $R_1$ stands for the residue of a coupling component selected from the group consisting of a trifluoromethylaniline, a trifluoromethylnaphthylamine, a trifluoromethyl-1,2,3,4-tetrahydroquinoline and a trifluoromethylbenzomorpholine, said coupling components being joined to the azo bond through a nuclear carbon atom and wherein said 1,2,3,4-tetrahydroquinoline and said benzomorpholine coupling components are joined to the azo bond through the carbon atom in the 6-position.

Although our invention or discovery relates broadly to the azo compounds having the formula just given, R is ordinarily a trifluoromethylaniline coupling component. Of these compounds having a trifluoromethylaniline coupling component those of the formula:

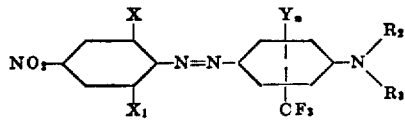

wherein X stands for a member selected from the group consisting of hydrogen, a nitro group and a halogen atom, $X_1$ stands for a member selected from the group consisting of hydrogen, a halogen atom, an alkylketo group, an alkyl group, an alkoxy group, a cyano group, a hydroxy group, an alkylsulfone group and a sulfonamide group, $R_2$ stands for a member selected from the group consisting of hydrogen, an alkyl group and a hydroxyalkyl group, $R_3$ stands for a member selected from the group consisting of a hydroxyalkyl group, an alkoxyalkyl group, and an unsaturated hydrocarbon group whose unsaturation consists of a double bond, Y stands for a member selected from the group consisting of an alkoxy group, a halogen atom and an alkylacylamino group and $n$ stands for a member selected from the group consisting of 0, 1 and 2, appear to be advantageous, especially insofar as the dyeing of cellulose acetate is concerned. Generally speaking the compounds just indicated are advantageous although compounds wherein the coupling component is a N-hydroxyalkyl trifluoromethyl-1,2,3,4-tetrahydroquinoline and the diazonium compounds are the same as those just indicated for the trifluoromethylaniline coupling components are also advantageous.

The term "alkyl" as used herein and in the claims refers to unsubstituted alkyl groups such as, for example, the methyl group, the ethyl group, a propyl group or a butyl group. By "hydroxyalkyl" is meant groups, for example, such as β-hydroxyethyl, β-hydroxypropyl, β γ-dihydroxypropyl and δ-hydroxybutyl. By "alkoxyalkyl" is meant groups, for example, such as β-methoxyethyl, β-ethoxyethyl, δ-methoxybutyl and γ-methoxypropyl.

By "an unsaturated hydrocarbon group whose unsaturation consists of a double bond" is meant groups, for example, such as allyl, methallyl and —CH₂CH₂CH=CH₂. By "an alkylacylamino group" is meant a group such as acetylamino, propionylamino and butyrylamino. Also we would note that "furfuryl" groups which can replace a replaceable hydrogen atom attached to a nitrogen atom of the coupling component include, for example, furfuryl, tetrahydrofurfuryl, 5-ethylfurfuryl, 5-β-hydroxyethyltetrahydrofurfuryl and 5-ethyltetrahydrofurfuryl.

Both sulfonated and non-sulfonated compounds are included within the scope of our invention or discovery. The nuclear non-sulfonated compounds have been found to be especially of value for the dyeing of organic derivatives of cellulose, especially cellulose acetate and it is to these compounds and their application for the dyeing of organic derivatives of cellulose that our invention or discovery is especially directed. These nuclear non-sulfonated compounds likewise possess some application for the dyeing of wool, silk and nylon. For the dyeing of cellulose acetate, the nuclear non-sulfonated azo compounds wherein R is the residue of a benzene nucleus are generally advantageous.

The nuclear sulfonated compounds of our invention or discovery have little or no utility for the dyeing of organic derivatives of cellulose but possess application for the dyeing of wool, silk and nylon. Preferably, when the dye compounds are to be employed for the coloration of organic derivatives of cellulose, they should contain no nuclear free carboxylic acid group. Blue, blue-green, orange and yellow shades, for example, can be obtained using the dye compounds of the invention.

The azo compounds described herein can be prepared by diazotizing an arylamino compound of the benzene series, an arylamino compound of the naphthalene series, or an aminoazobenzene and coupling the diazonium compounds obtained with a trifluoromethylaniline, a trifluoromethylnaphthylamine, a trifluoromethyl-1,2,3,4-tetrahydroquinoline and a trifluoromethylbenzomorpholine coupling component. The diazotization and coupling reactions involved in the preparation of the azo compounds of our invention or discovery involve no techniques not well known to those skilled in the art.

The following examples illustrate the preparation of the azo compounds of our invention or discovery:

Example 1

.1 gram mole of p-nitroaniline is diazotized in known fashion and the diazonium compound obtained is added slowly, with stirring, to an aqueous hydrochloric acid solution of m-di-$\beta$-hydroxyethylaminotrifluoromethylbenzene which has been cooled to a temperature of 0–10° C. Throughout the coupling reaction which takes place, the reaction mixture is maintained at a temperature of 0–10° C. After complete addition of the diazonium compound, the reaction mixture is permitted to stand for some time after which it is made neutral to Congo red paper by adding sodium carbonate. The dye compound formed is recovered by filtration, washed with water and dried. It has the formula:

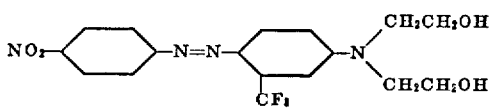

and colors cellulose acetate, wool, silk and nylon orange shades.

Example 2

.1 gram mole of p-nitroaniline is diazotized in known fashion and the diazonium compound obtained is added slowly, with stirring, to an aqueous hydrochloric acid solution of o-mono-$\beta,\gamma$-dihydroxypropylaminotrifluoromethylbenzene which has been cooled to a temperature of 0–10° C. Coupling and recovery of the dye compound formed can be carried out in accordance with the procedure described in Example 1. The dye compound obtained has the formula:

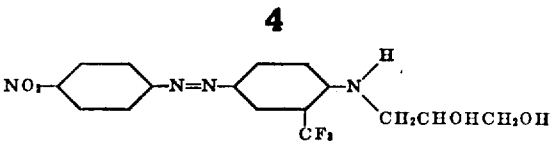

and colors cellulose acetate, wool, silk and nylon orange shades.

Example 3

.1 gram mole of 1-amino-2,4-dinitrobenzene-6-sulfonethylamide is diazotized at a temperature of 0–5° C. with nitrosyl sulfuric acid in the usual manner. The diazonium solution resulting is poured into water and the insoluble diazo compound which precipitates out is recovered by filtration and then dissolved in acetic acid. .1 gram mole of N-$\beta,\gamma$-dihydroxypropyl-2-methyl-7-trifluoromethyl-1,2,3,4-tetrahydroquinoline is dissolved in glacial acetic acid. The diazo solution prepared as described above is then added with stirring while maintaining a temperature of 10–20° C. The coupling reaction which takes place is completed by adding sodium acetate until the reaction mixture is no longer acid to Congo red paper. Upon completion of the coupling reaction, the mixture is poured into water and the precipitated dye compound is recovered by filtration, washed with water and dried. The dye compound obtained has the formula:

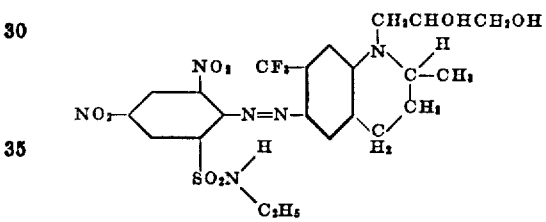

and colors cellulose acetate, wool, silk and nylon blue shades.

Example 4

.1 gram mole of 1-amino-4-trifluoromethylketonebenzene is diazotized in known fashion and the diazonium compound obtained is coupled with .1 gram mole of 2-methoxy-5-trifluoromethyl-$\beta,\gamma$-dihydroxypropylaniline. Coupling and recovery of the dye compound formed can be carried out in accordance with the procedure described in Example 1. The dye compound obtained has the formula:

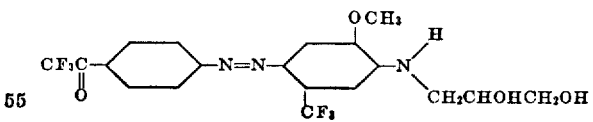

and colors cellulose acetate, wool, silk and nylon orange shades.

Example 5

.1 gram mole of diazotized 1-amino-2-chloro-4-nitrobenzene is added to a cold dilute hydrochloric acid solution of o-$\beta$-hydroxyethylaminotrifluoromethylbenzene. On standing, the hydrochloride of the desired dye compound separates from the reaction mixture and is recovered by filtration. By treatment with sodium hydroxide, the free form of the dye which has the formula:

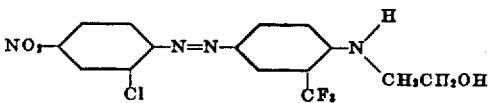

is obtained. The dye compound colors cellulose acetate, wool, silk and nylon orange shades.

Example 6

.1 gram mole of p-nitroaniline is diazotized and the diazonium compound obtained is added to a cold acetic acid solution of 1-β,γ-dihydroxypropylamino-5 - trifluoromethyl - naphthalene. The coupling reaction which takes place is carried out while maintaining the reaction mixture at a temperature of 0–10° C. and is completed by adding sodium carbonate until the reaction mixture is neutral to Congo red paper. The dye compound formed is precipitated by adding water to the reaction mixture, recovered by filtration, washed with water and dried. The dye compound obtained has the formula:

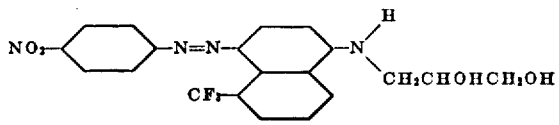

and colors cellulose acetate, wool, silk and nylon red shades.

.1 gram mole of 2-amino-5-nitrotrifluoromethylbenzene can be substituted for the p-nitroaniline of the above example to obtain a dye compound which likewise colors the materials above named blue shades.

Example 7

.1 gram mole of diazotized 1-amino-2,4-dinitrobenzene is added to a cold dilute mineral acid solution of 2-trifluoromethyl-5-acetaminodi-β-hydroxyethylaniline. Upon completion of the coupling reaction and recovery of the dye compound, a dye compound having the formula:

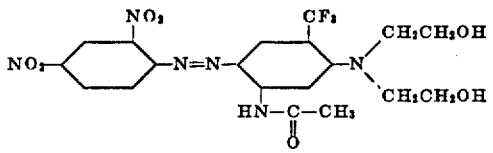

is obtained. The dye compound obtained colors cellulose acetate, wool, silk and nylon violet shades.

Example 8

.1 gram mole of 1-amino-2,4-dinitrobenzene-6-sulfonethylamide is diazotized as described in Example 3 and the diazonium compound obtained is coupled in accordance with the procedure described in Example 3 with .1 gram mole of 1 - β,γ - dihydroxypropyl - 2 - methyl - 7 - tri - fluoromethylbenzomorpholine. The dye compound obtained has the formula:

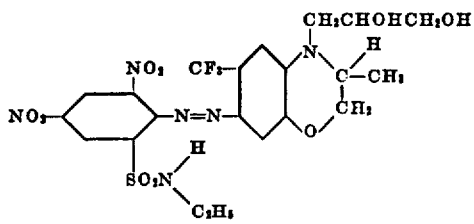

and colors cellulose acetate, wool, silk and nylon blue shades.

Example 9

.1 gram mole of diazotized 1-amino-2,4-dinitro-6-chlorobenzene is coupled with .1 gram mole of 1 - β,γ - dihydroxypropyl - 2 - trifluorometh - yl-1,2,3,4-tetrahydroquinoline. Coupling and recovery of the dye compound formed can be carried out in accordance with the procedure described in Example 3. The dye compound obtained has the formula:

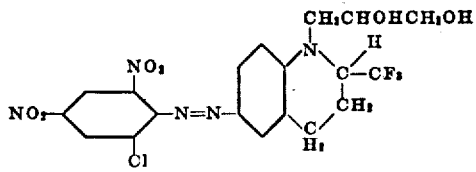

and colors cellulose acetate, wool, silk and nylon blue shades.

Example 10

.1 gram mole of p-aminoazobenzene is diazotized and the diazonium compound obtained is coupled with .1 gram mole of m-(ethyl-,β-hydroxyethyl - )amino - trifluoromethylbenzene. Coupling and recovery of the dye compound formed can be carried out in accordance with the procedure described in Example 1. The dye compound obtained has the formula:

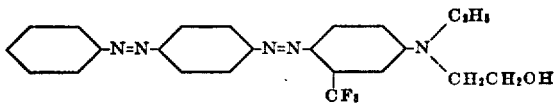

and colors cellulose acetate, wool, silk and nylon orange shades.

.1 gram mole of 1-β-hydroxyethylamino-8-trifluoromethylnaphthalene can be substituted for the coupling component of the example and the coupling and recovery of the dye compound carried out in an acetic acid or dilute hydrochloric acid solution in accordance with the procedure described in Example 1. Coupling takes place in para position to the amino group of the naphthalene coupling component. The dye compound obtained colors cellulose acetate, wool, silk and nylon rubine shades.

Example 11

.1 gram mole of 4-nitrobenzeneazo-(1,1')-2'-trifluoromethyl-4'-aminobenzene is diazotized and the diazonium compound obtained is coupled with .1 gram mole of 1-pentaerythritylamino-5-hydroxynaphthalene. Coupling and recovery of the dye compound formed can be carried out in accordance with the general procedure described in Example 6. The dye compound obtained colors cellulose acetate, wool, silk and nylon blue shades. Coupling takes place in para position to the amino group of the naphthalene coupling component. The starting dye compound of the example can be prepared by coupling diazotized p-nitroaniline with m-trifluoromethylaniline.

Example 12

.1 gram mole of 4-nitrobenzeneazo-(1,1')-2'-trifluoromethyl - 4' - di - β - hydroxyethylamino - benzene is suspended in water and reduced in known fashion with .25 gram mole of sodium sulfide. The resulting 4-aminobenzeneazo-(1,1')-2' - trifluoromethyl - 4' - di - β - hydroxyethyl - aniline obtained colors cellulose acetate yellow from an aqueous suspension of the dye. Because of the free amino group present in this dye compound the dye compound can be applied, for example, to cellulose acetate, diazotized on the fiber and coupled with a coupling component such as β-naphthol, di-β-hydroxyethylaniline or 2-hydroxy-3-naphthoic acid. The last named coupling component yields black shades whereas the first two named coupling components yield red shades.

Example 13

.1 gram mole of diazotized α-naphthylamine is coupled with .1 gram mole of 1-β,γ-dihydroxypropylamino-2-trifluoromethylbenzene. The dye compound obtained colors cellulose acetate, wool, silk and nylon rubine shades.

Example 14

.1 gram mole of 1-amino-8-naphthol-4-sulfonic acid is diazotized and the diazonium compound obtained is coupled with .1 gram mole of 1 - β - hydroxypropylamino - 2 - trifluoromethylbenzene. The dye compound obtained colors wool and silk violet shades.

Example 15

.1 gram mole of diazotized 1-amino-5-naphthol is coupled with .1 gram mole of 1-β,γ-dihydroxypropylamino - 5 - trifluoromethylnaphthalene. The dye compound obtained colors cellulose acetate, wool, silk and nylon rubine shades.

Example 16

.1 gram mole of 1-amino-2,4-dinitro-6-chlorobenzene is coupled with .1 gram mole of m-di-β-hydroxyethylaminotrifluoromethylbenzene. The dye compound obtained colors cellulose acetate, wool, silk and nylon rubine shades.

Example 17

.1 gram mole of diazotized 2-amino-5-nitrobenzenesulfonic acid is coupled with .1 gram mole of 1 - (ethyl,β - hydroxyethyl) - amino - 3 - trifluoromethylbenzene. The dye compound obtained colors wool and silk red shades.

Example 18

.1 gram mole of diazotized 4-amino-5-nitrobenzene-sulfonic acid is diazotized and coupled with .1 gram mole of N-β-hydroxyethyl-2-trifluoromethyl - 1,2,3,4 - tetrahydroquinoline. The dye compound obtained colors wool and silk reddish-violet shades.

The following tabulation further illustrates the compounds included within the scope of our invention or discovery. The compounds indicated below may be prepared by diazotizing the amines listed under the heading "Amine" and coupling the diazonium compounds obtained with the compounds specified in the column entitled "Coupling component." The diazotization and coupling reactions can be carried out following the procedure indicated hereinbefore. The color given is that yielded by the dye on the materials which it is adapted to color. These materials have been previously indicated.

| Amine | Coupling Component | Color |
|---|---|---|
| 1-amino-2-methyl-4-nitrobenzene | 1-β-ethoxyethylamino-2,5-trifluoromethylbenzene | orange. |
| 1-amino-2-methoxy-4-nitrobenzene | 1-(β-hydroxyethyl,β-ethoxy-ethyl)-amino-2-chloro-5-trifluoromethylbenzene. | Do. |
| 1-amino-2-bromo-4-nitrobenzene | 1-(methyl,γ-hydroxypropyl)-amino-2-methoxy-5-trifluoromethylbenzene. | red. |
| 1-amino-2,6-dichloro-4-nitrobenzene | 1-sodium-β-sulfoethylamino-2-trifluoromethylbenzene | reddish-brown. |
| 1-amino-4-nitro-6-acetobenzene | N-β-sulfatoethyl-7-trifluoromethyl-1,2,3,4-tetrahydroquinoline | rubine. |
| 1-amino-4-nitrobenzene-6-methylsulfone | N-γ-phosphatopropyl-2-methyl-7-trifluoromethylbenzomorpholine. | Do. |
| 1-amino-4-nitrobenzene-6-ethylsulfone | 1-(ethyl,β-hydroxypropyl)-amino-3-trifluoromethylbenzene | Do. |
| 1-amino-4-nitrobenzene-6-methylsulfonamide | 1-(ethyl,β-hydroxyethyl)-amino-5-trifluoromethylnaphthalene | Do. |
| 1-amino-5-naphthol | N-β,γ-dihydroxypropyl-2-trifluoromethyl-1,2,3,4-tetrahydroquinoline. | Do. |
| 1-amino-4-nitro-6-acetobenzene | 1-mono-β-hydroxyethylamino-3-trifluoromethylbenzene | orange. |
| 1-amino-2-methyl-4-nitrobenzene | 1-mono-β-ethoxyethylamino-3-trifluoromethylbenzene | yellowish-orange. |
| 1-amino-2-cyano-4-nitrobenzene | 1-di-β-hydroxyethylamino-2-methoxy-5-trifluoromethylbenzene | rubine. |
| 1-amino-2-hydroxy-4-nitrobenzene | 1-(n-propyl-, β-hydroxyethyl-)amino-3-trifluoromethylbenzene | pinkish-red. |
| p-nitroaniline | 1-monoallylamino-3-trifluoromethylbenzene | orange. |
| 1-amino-2-methylsulfone-4-nitrobenzene | 1-(β-hydroxyethyl-, allyl-)amino-3-trifluoromethylbenzene | red. |
| 1-amino-2-sulfone-ethylamide-4-nitrobenzene | 1-(ethyl-, allyl-)amino-2-chloro-5-trifluoromethylbenzene | orange. |
| 1-amino-2-chloro-6-cyano-4-nitrobenzene | 1-(β,γ-dihydroxypropyl-, β-ethoxyethyl-)-amino-3-trifluoromethylbenzene. | red. |
| 1-amino-2,4-dinitro-6-cyanobenzene | 1-monomethylallylamino-3-trifluoromethylbenzene | rubine. |
| 1-amino-2-sulfonemethylamide-4-nitrobenzene | 1-(ethyl-, β-hydroxyethyl-)amino-2-trifluoromethylbenzene | orange. |
| 1-amino-2-chloro-4-nitrobenzene | 1-(butyl-, β-hydroxyethyl-)amino-3-trifluoromethylbenzene | Do. |
| 1-amino-2-hydroxy-4-nitrobenzene | 1-(β-hydroxyethyl-, β-methoxyethyl-)amino-3-trifluoromethylbenzene. | pinkish-red. |
| p-nitroaniline | 1-monotetrahydrofurfurylamino-3-trifluoromethylbenzene | orange. |
| 1-amino-2,6-dichloro-4-nitrobenzene | 1-(β-hydroxyethyl-, tetrahydrofurfuryl-)amino-3-trifluoromethylbenzene. | red. |
| 1-amino-2,4-dinitronaphthalene | 1-(mono-β,γ-dihydroxypropyl)-amino-5-trifluoromethylnaphthalene. | violet. |
| 1-amino-2,4-dinitronaphthalene | 1-(ethyl-, γ-hydroxypropyl-)amino-3-trifluoromethylbenzene | rubine. |
| 2-amino-5-nitrobenzenesulfonic acid | N-β,γ-dihydroxypropyl-2-methyl-7-trifluoromethylbenzomorpholine. | Do. |
| 1-amino-2,4-dinitronaphthalene | N-β,γ-dihydroxypropyl-2-trifluoromethylbenzomorpholine | violet. |
| 4-amino-5-chlorobenzenesulfonic acid | N-β,γ-dihydroxypropyl-7-trifluoromethyl-1,2,3,4-tetrahydroquinoline. | red. |

It will be understood that the foregoing examples are intended to be illustrative and not limitative of our invention or discovery. The diazonium compounds of any of the amines indicated herein can be coupled, for example, with any of the coupling components indicated herein to yield dye compounds of the invention or discovery. Additional amines that can be diazotized and employed in the preparation of the dye compounds include, for example, o-chloroaniline, m-sulfanilic acid, p-sulfanilic acid, 4-amino-5-nitrobenzenesulfonic acid, 2 - amino - 5 - bromobenzenesulfonic acid, 3 - amino - 4 - hydroxy - 6-chlorobenzenesulfonic acid, 3 - amino - 4 - hydroxy - 5 - chlorobenzenesulfonic acid, 3 - amino - 4 - hydroxy - 6 - methylbenzenesulfonic acid, 1-amino-2,4-dinitro-6-hydroxybenzene, 1-amino-2-naphthol-4-sulfonic acid, 2-amino-5-naphthol-4-sulfonic acid, 1-naphthylamine-6,8-disulfonic acid, 4 - amino- 4' -nitroazobenzene, 4-amino-4'-sulfoazobenzene and 4 - amino - 2' - chloro-4'-nitroazobenzene.

In order that the preparation of the azo compounds of our invention or discovery may be clearly understood the preparation of the coupling components used in their manufacture is given hereinafter. Not all the compounds whose preparation is given are necessarily new.

Preparation of 1-β,γ-dihydroxypropylamino-2-methoxy-5-trifluoromethylbenzene This compound can be prepared by heating 1 gram mole of 1-amino-2-methoxy-5-trifluoromethylbenzene with 1.1 gram moles of glycerol chlorohydrin and 1.1 gram moles of sodium bicarbonate at 145 C. for six hours. The reaction mixture is poured into water and steam distilled. The desired product is recovered from the distillate by decantation.

*Preparation of 1-amino-2-trifluoromethylbenzene* o-Nitrotrichloromethylbenzene is reacted with antimony trifluoride in accordance with the procedure described by Swarts Bulletin de l'Academie Royal Belgique (3), vol. 35, pages 375–420 to obtain 1-nitro-2-trifluoromethylbenzene, which is reduced, for example, by the classical iron and hydrochloric acid method to 1-amino-2-trifluoromethylbenzene.

*Preparation of 1-di-(β-hydroxyethylamino)-2-trifluoromethyl-5-acetaminobenzene*

One gram mole of p-aminotrifluoromethylbenzene is dissolved in 500 cc. of cold sulfuric acid (sp. gr. 1.84) and 1.1 gram moles of nitric acid (sp. gr. 1.5) are added at 0° C. The reaction mixture is allowed to warm to room temperature following which it is poured into 2 liters of water and ice. The solid which precipitates is filtered off and the acid solution is neutralized to liberate p-amino-o-nitrotrifluoromethylbenzene which is recovered by filtration and dried.

p-Acetamino-o-nitrotrifluoromethylbenzene is prepared by reacting the compound formed above with an equivalent gram molecular weight of acetic anhydride. The resulting acetylated compound is reduced to p-acetamino-o-aminotrifluoromethylbenzene by treatment with hydrogen in the presence of Raney nickel at 50° C. under a hydrogen pressure of 1500 pounds using dioxane as a solvent. The reaction mixture is removed from the autoclave in which the reduction reaction is carried out, filtered to remove the Raney nickel and then reacted in a suitable reaction vessel at 180–200° C. with 2.2 gram molecular equivalents of ethylene oxide for 10 hours to give a good yield of the desired compound boiling at 250–255° C./1 mm. which is recovered by distilling the reaction mixture under reduced pressure.

*Preparation of 2-methyl-7-trifluoromethylbenzomorpholine*

One gram mole of 3-nitro-4-hydroxytrifluoromethylbenzene is dissolved in 1 liter of ethanol and 1 gram mole of sodium ethylate is added. One gram mole of chloroacetone is then added slowly at room temperature and the reaction which takes place is completed by warming. The reaction mixture is filtered and the filtrate consisting of a solution of 3-nitro-4-acetonoxytrifluoromethylbenzene is purified by treatment with animal charcoal, filtered, and charged into a shaking autoclave together with 20 grams of Raney nickel. The reaction mixture is heated rapidly with shaking to 100° C. under a hydrogen pressure of 1800 pounds. When about 4 moles of hydrogen have been absorbed the reaction mixture is cooled, the nickel removed by filtration, and the desired product recovered by distillation under reduced pressure. The desired product boils at 91–94° C./1 mm.

*Preparation of 7-trifluoromethyl-1,2,3,4-tetrahydroquinoline*

A mixture composed of 45 grams of 95% glycerol, 48.3 grams of m-trifluoromethylaniline, 36.5 grams of m-nitrobenzenesulfonic acid, and 91.5 grams of concentrated sulfuric acid (sp. gr. 1.84) was heated under reflux until a vigorous reaction started. (A temperature of about 140–145° C.) After the reaction had subsided, the mixture was refluxed for about 6 hours. The reaction mixture was then made alkaline by adding a 20% sodium hydroxide solution after which it was extracted with benzene. The benzene extract was distilled under reduced pressure and the 7-trifluoromethylquinoline formed was collected at 115–120° C./22 mm. A 73% yield of the desired product was obtained.

The 7-trifluoromethylquinoline was treated with hydrogen in the presence of Raney nickel in a suitable pressure vessel in about 3 times its weight of ethyl alcohol. The reduction took place at 120–130° C. under a pressure of 1000 pounds. 7-trifluoromethyl-1,2,3,4-tetrahydroquinoline was obtained by distillation under reduced pressure and has a boiling point of 135–140° C./22 mm.

*Preparation of di-β-hydroxyethylamino-3-trifluoromethylbenzene*

This compound can be prepared by reacting 1 gram mole of m-aminotrifluoromethylbenzene and 2.2 gram moles of ethylene oxide at a temperature of 160–180° C. for 6 hours in a shaking autoclave. The autoclave is cooled and the desired product is removed and purified by distillation under reduced pressure.

*Preparation of 1-amino-2,5-trifluoromethylbenzene*

1-chloro-2,5-dimethylbenzene is chlorinated in ultra violet light at about 125° C. until 6 atoms of chlorine have been absorbed. The chlorinated material is fractionated to obtain the 1-chloro-2,5-trichloromethylbenzene formed by the reaction which in turn is reacted with antimony trifluoride in accordance with the procedure described by Swarts in Bulletin de l'Academie Royal Belgique (3), vol. 35, pages 375–420. One gram mole of the 1-chloro-2,5-trifluoromethylbenzene formed is then put in a shaking autoclave in a copper liner together with 1 liter of ammonia water and the reaction mixture is heated at 180–210° C. for 10 hours. When cool the reaction mixture is removed and the 1-amino-2,5-trifluoromethylbenzene is recovered by extraction with dilute hydrochloric acid from which it can be recovered by fractional distillation under reduced pressure.

*Preparation of 1-mono-β-ethoxyethylamino-2,5-trifluoromethylbenzene*

This compound is prepared by refluxing 1 gram mole of 1-amino-2,5-trifluoromethylbenzene, 1.2 gram moles of β-ethoxyethylbromide and 1.2 gram moles of sodium bicarbonate.

*Preparation of 2-trifluoromethylbenzomorpholine*

One gram mole of o-nitrophenol is reacted with chlorotrifluoroacetone in accordance with the procedure described in connection with the preparation of 2-methyl-7-trifluoromethylbenzomorpholine and the resulting o-nitro-ω-trifluorophenoxyacetone is reduced to 2-trifluoromethylbenzomorpholine. The reduction is carried out in accordance with the procedure described for 2-methyl-7-trifluoromethylbenzomorpholine. The desired compound boils at 84–88° C./1 mm.

*Preparation of 5-aminotrifluoromethylnaphthalene*

One gram mole of α-trichloromethylnaphthalene is heated in a glass retort with 1.2 gram moles of antimony trifluoride until a vigorous evolution of α-trifluoromethylnaphthalene takes place. The last of the trifluoro compound is removed from the resulting antimony trichloride under reduced pressure.

The product obtained above is nitrated as described for naphthalene in German Patent 100,417 to give a mixture of 5- and 8-nitro-1-trifluoromethylnaphthalene. These isomers are separated by fractional crystallization from a solvent such as methanol, benzene or pyridine.

One gram mole of 5-nitro-1-trifluoromethylnaphthalene is reduced in a shaking autoclave in 500 cc. of methanol and in the presence of 3 grams of Raney nickel at 40° C. under a hydrogen pressure of 1500 pounds. The desired compound is obtained by distillation under reduced pressure of the filtrate obtained from filtration of the reaction mixture to remove nickel.

*Preparation of N-β,γ-dihydroxypropyl-2-trifluoromethyl-1,2,3,4-tetrahydroquinoline*

One gram of 2-tri(chloro or bromo)methylquinoline is reacted with 1.2 gram moles of antimony trifluoride in accordance with the procedure indicated hereinbefore. The resulting 2-trifluoromethylquinoline is purified by washing with an alkali following which it is recovered by distillation under reduced pressure.

One gram mole of the 2-trifluoromethylquinoline prepared above is charged into an autoclave together with 5 grams of Raney nickel and about three times its weight of ethyl alcohol and reduced at about 100° C. under hydrogen pressure of 1600 pounds. The resulting 2-trifluoromethyl-1,2,3,4-tetrahydroquinoline compound is converted to the desired compound by heating with 1.1 gram molecular equivalents of

at 140° C. in the presence of 1.1 gram molecular equivalents of sodium bicarbonate.

*Preparation of 2-methyl-7-trifluoromethyl-1,2,3,4-tetrahydroquinoline*

48.3 grams of m-trifluoromethylaniline, 36.5 grams of m-nitrobenzenesulfonic acid, 91.5 grams of concentrated sulfuric acid and 40 grams of water are placed in a flask equipped with a mechanical stirrer, reflux condenser and dropping funnel. The mixture is heated to about 130° C. and 25 grams of crotonaldehyde (unpolymerized) is gradually added while maintaining the reaction temperature at about 130° C. Normally external cooling is employed as this permits the crotonaldehyde to be added more rapidly. Care should be taken not to let the temperature fall below about 125° C. because if the temperature falls too low the reaction may not proceed as fast as the crotonaldehyde is added and a delayed reaction may take place with violence. After the crotonaldehyde has been added heating is continued at 130° C. for 5–6 hours. On cooling, phenylhydroxylamine-m-sulfonic acid separates and can be recovered by filtration if desired. The reaction product contains a trace of m-trifluoromethylaniline and about 2% of N-n-butyl-m-trifluoromethylaniline. The reaction product can be worked up as follows.

The reaction mixture is poured into 400 cc. of water and sodium nitrite is added until a positive test for nitrous acid is obtained. About 11 grams of sodium nitrite is required. Then the mixture is made alkaline with sodium hydroxide (about 85 grams). Following this the reaction mixture is steam-distilled using a continuous steam distillation process. 2-methyl-7-trifluoromethylquinoline crystallizes from the distillate on cooling. 2-methyl-7-trifluoromethylquinoline can be converted to 2-methyl-7-trifluoromethyl-1,2,3,4-tetrahydroquinoline by reduction with hydrogen in the presence of Raney nickel following the procedure indicated hereinbefore.

In some instances the preparation of the free amino form of the coupling component has been described. However, the manner of introducing groups such as β-hydroxyethyl- and β,γ-dihydroxypropyl-, for example, into the amino group is well known to those skilled in the art and need not be described here.

The azo compounds of our invention or discovery are, for the most part, relatively insoluble in water and, accordingly, they may be advantageously directly applied to the material undergoing coloration in the form of an aqueous suspension which can be prepared by grinding the dye to a paste in the presence of a sulfonated oil, soap, or other suitable dispersing agent and dispersing the resulting paste in water. Where the dye possesses a sulfonic acid group or other water-solubilizing group it may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye material is employed although any desired proportions can be used.

Suitable dispersing agents together with the amounts that may be employed are disclosed in McNally and Dickey Patent No. 2,115,030, issued April 26, 1938. The process disclosed in this patent for the dyeing of cellulose acetate silk can be used in applying the dyes of the present application to this material.

It will be understood that textile materials prepared from organic derivatives of cellulose, wool, silk, and nylon, or mixture of these materials, can be directly colored from an aqueous dyebath in accordance with the procedure indicated herein. However, other suitable methods for the dyeing of these materials are known to those skilled in the art and these methods of course can be used in applying the dye compounds of this invention if desired. Where lacquers composed of cellulose esters and cellulose ethers, for example, are to be colored, the dye compounds of our invention or discovery may be applied to these materials by the methods employed in the art for their coloration.

It is here noted that the term "nylon" refers to a nuclear polyamide resin which is believed to be basically described or claimed in U. S. Letters Patent No. 2,071,250, issued February 16, 1937 to Wallace H. Carothers.

We claim:
1. An azo compound having the formula:

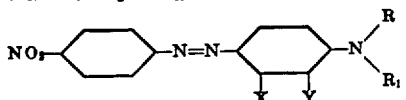

wherein R stands for a member selected from the group consisting of a hydrogen atom and a hydroxyalkyl group containing at least two but no more than four carbon atoms, $R_1$ stands for a hydroxyalkyl group containing at least two but no more than four carbon atoms and in which one of the members X and Y is a trifluoromethyl group and the other is a hydrogen atom and wherein when Y is a trifluoromethyl group R must be a hydrogen atom.

2. The azo compounds having the formula:

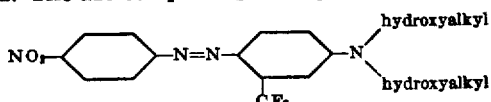

wherein hydroxyalkyl stands for a hydroxyalkyl group containing at least two but no more than four carbon atoms.

3. The azo compounds having the formula:

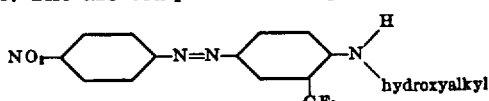

wherein hydroxyalkyl stands for a hydroxyalkyl group containing at least two but no more than four carbon atoms.

4. The azo compound having the formula:

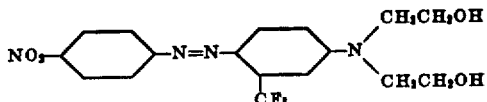

5. The azo compound having the formula:

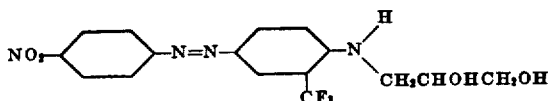

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,251,947 | McNally et al. | Aug. 12, 1941 |
| 2,067,726 | Ohlendorf et al. | Jan. 12, 1937 |
| 2,153,018 | Heyna et al. | Apr. 4, 1939 |
| 2,071,875 | Engelmann | Feb. 23, 1937 |
| 2,194,927 | Daudt | Mar. 26, 1940 |
| 2,173,054 | Hitch | Sept. 12, 1939 |
| 2,265,559 | Kirst | Nov. 25, 1941 |
| 2,071,875 | Engelmann | Feb. 23, 1937 |

Certificate of Correction

Patent No. 2,432,393.                    December 9, 1947.

JOSEPH B. DICKEY ET AL.

It is hereby certified that error appears in the printed specification of the above numbered patent requiring correction as follows: Column 11, line 22, after the word "gram" insert *mole*; and that the said Letters Patent should be read with this correction therein that the same may conform to the record of the case in the Patent Office.

Signed and sealed this 2nd day of March, A. D. 1948.

[SEAL]

THOMAS F. MURPHY,
*Assistant Commissioner of Patents.*

We claim:
1. An azo compound having the formula:

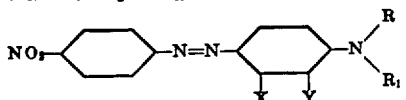

wherein R stands for a member selected from the group consisting of a hydrogen atom and a hydroxyalkyl group containing at least two but no more than four carbon atoms, R₁ stands for a hydroxyalkyl group containing at least two but no more than four carbon atoms and in which one of the members X and Y is a trifluoromethyl group and the other is a hydrogen atom and wherein when Y is a trifluoromethyl group R must be a hydrogen atom.

2. The azo compounds having the formula:

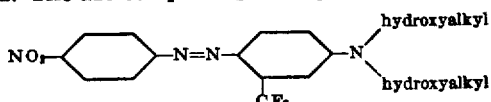

wherein hydroxyalkyl stands for a hydroxyalkyl group containing at least two but no more than four carbon atoms.

3. The azo compounds having the formula:

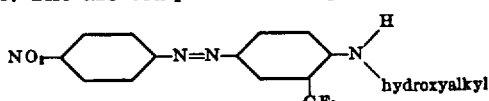

wherein hydroxyalkyl stands for a hydroxyalkyl group containing at least two but no more than four carbon atoms.

4. The azo compound having the formula:

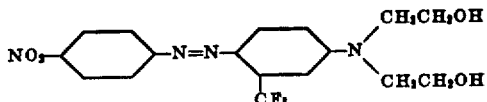

5. The azo compound having the formula:

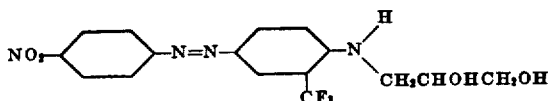

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,251,947 | McNally et al. | Aug. 12, 1941 |
| 2,067,726 | Ohlendorf et al. | Jan. 12, 1937 |
| 2,153,018 | Heyna et al. | Apr. 4, 1939 |
| 2,071,875 | Engelmann | Feb. 23, 1937 |
| 2,194,927 | Daudt | Mar. 26, 1940 |
| 2,173,054 | Hitch | Sept. 12, 1939 |
| 2,265,559 | Kirst | Nov. 25, 1941 |
| 2,071,875 | Engelmann | Feb. 23, 1937 |

Certificate of Correction

Patent No. 2,432,393.                December 9, 1947.

JOSEPH B. DICKEY ET AL.

It is hereby certified that error appears in the printed specification of the above numbered patent requiring correction as follows: Column 11, line 22, after the word "gram" insert *mole*; and that the said Letters Patent should be read with this correction therein that the same may conform to the record of the case in the Patent Office.

Signed and sealed this 2nd day of March, A. D. 1948.

[SEAL]

THOMAS F. MURPHY,
*Assistant Commissioner of Patents.*